Figure 1:
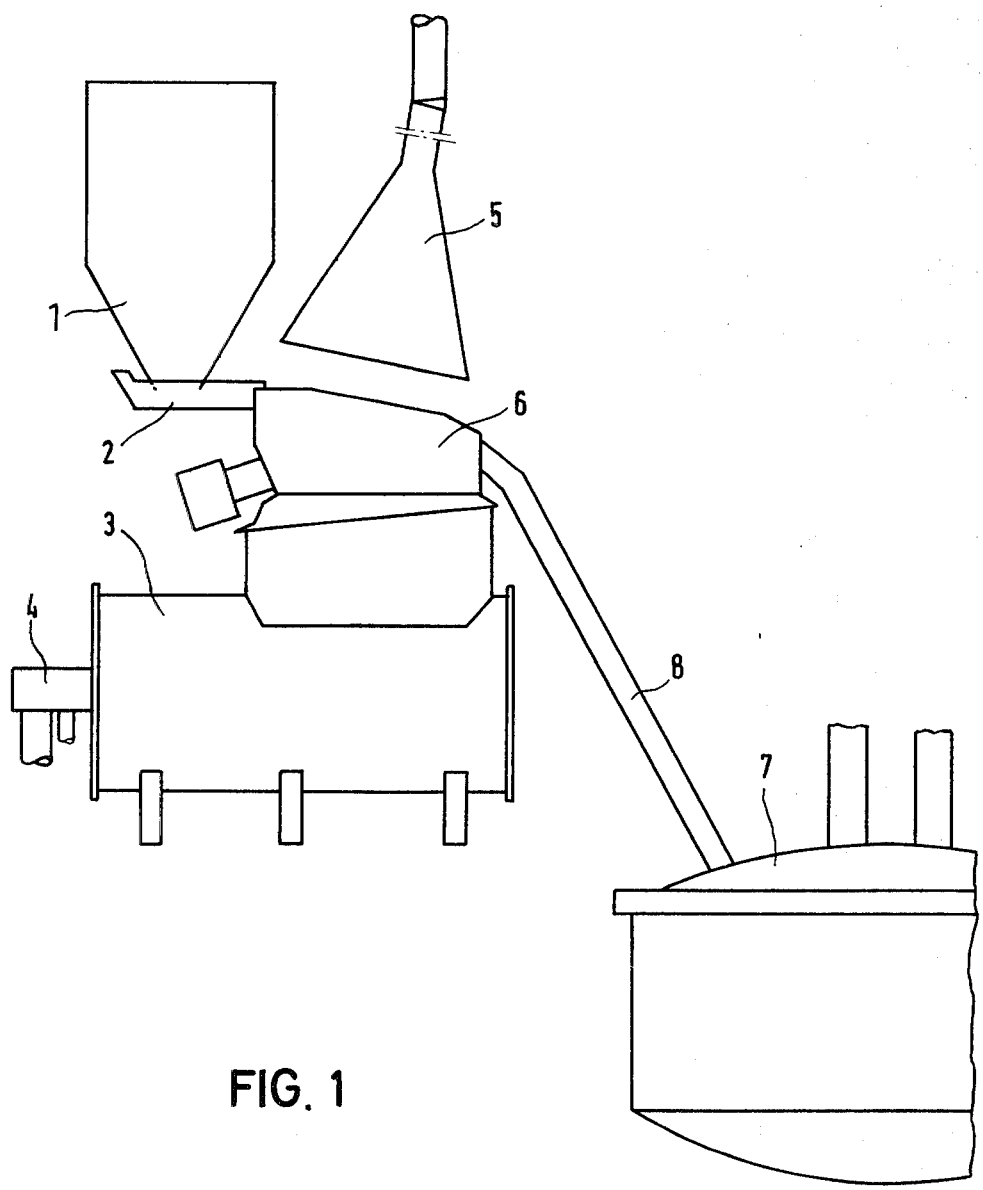

United States Patent [19]

Sensis et al.

[11] 4,290,800
[45] Sep. 22, 1981

[54] PROCESS FOR FEEDING IRON SPONGE INTO AN ELECTRIC ARC FURNACE

[75] Inventors: Siegfried Sensis, Seevetal; Joachim Schwerdtfeger, Barum; Klaus Walden, Buxtehude; Dieter Ameling, Schwiederstorf, all of Fed. Rep. of Germany

[73] Assignee: Hamburger Stahlwerke GmbH, Hamburg, Fed. Rep. of Germany

[21] Appl. No.: 76,227

[22] Filed: Sep. 17, 1979

[30] Foreign Application Priority Data

Sep. 20, 1978 [DE] Fed. Rep. of Germany ....... 2840945

[51] Int. Cl.³ .............................................. C21C 5/52
[52] U.S. Cl. ............................................ 75/12; 75/11
[58] Field of Search ...................................... 75/10-12

[56] References Cited

U.S. PATENT DOCUMENTS

| 2,805,930 | 9/1957 | Udy | 75/11 |
| 3,163,520 | 12/1964 | Collin | 75/11 |
| 3,276,859 | 10/1966 | Collin | 75/11 |

Primary Examiner—P. D. Rosenberg

[57] ABSTRACT

Iron sponge, containing at least 0.5% carbon, is preheated with an oxidizing gas as the gas flows in a direction traverse to the direction of the sponge, without combustion of the iron sponge.

10 Claims, 2 Drawing Figures

PROCESS FOR FEEDING IRON SPONGE INTO AN ELECTRIC ARC FURNACE

DESCRIPTION

The invention relates to a process for feeding iron sponge into an electric arc furnace, wherein the moved iron sponge is pre-heated with hot gas.

In a known process of this kind (see 'Stahl und Eisen', 95, 16–23 (1975)), the iron sponge is passed through a rotary pipe which is heated from the outside by means of hot gas which passes through the rotary pipe and over the iron sponge. The hot gas used is the waste gas from an oil burner and the hot waste gases of the electric furnace. With this mode of operation, direct contact between the iron sponge and the hot gas is substantially avoided, in order to prevent re-oxidation of the oxidation-sensitive iron sponge by oxygen-bearing components of the hot gas. In order to reach the desired heating temperature of about 800° to 1000° C., the rotary pipe must be of considerable length. This results in considerable investment costs; in addition, it is frequently impossible for a rotary pipe of this kind subsequently to be fitted to an existing electric furnace, because of the considerable amount of space required.

It is known that iron sponge which is produced by the direct reduction of lump or pelletised iron ore is porous and has a large active internal surface area. Such iron sponge already suffers from oxidation from about 200° C. by oxygen ($O_2$) and oxygen carriers such as water ($H_2O$) or carbon dioxide ($CO_2$). In the subsequent smelting operation in the electric furnace, the iron oxide formed (FeO) is substantially lost in the form of a slag component, or must be reduced again by expensive cooking processes. Because of this danger of oxidation, the men skilled in the art have hitherto not considered direct contact between the iron sponge and the usual burner waste gases, for the purposes of pre-heating iron sponge.

The problem of the present invention is to provide a simpler process which can be carried out with more compact equipment, for pre-heating iron sponge, which process can be used for charging existing electric furnaces with pre-heated iron sponge.

The solution to this problem, in accordance with the invention, is a process having the features recited in claim 1. Advantageous embodiments and developments of this process are set out in the subsidiary claims.

The invention is based on the surprising discovery that, under conditions which result in combustion of the carbon, carbon-bearing iron sponge can be heated in a direct contact mode by means of conventional burner waste gases, without a substantial reduction in the degree of metallisation ($Fe_{met} \times 100/Fe_{ges}$). In this way, in order to feed pre-heated iron sponge into an electric arc furnace, it is possible for the iron sponge to be moved in the form of a loose fill, and for the hot gas to be passed through the fill transversely to the direction of movement, in direct contact with the iron sponge. The direct contact results in a very good degree of heat transfer so that heating to a temperature of 800° C. and more can be effected within a short distance. The pre-heating operation can therefore be effected with a simple compact apparatus which can be subsequently fitted to existing electric furnaces.

Pre-heating the iron sponge by means of fossil fuels before introduction into the electric arc furnace provides the known advantages such as reduced current requirement for producing the steel smelt, shortened charging times, a lower degree of electrode wear and an increased service life for the furnace cladding. Preheating to about 800° C. can save about 33% of the electrical power which is required for smelting cold iron sponge (without finishing the steel).

Figure 2:
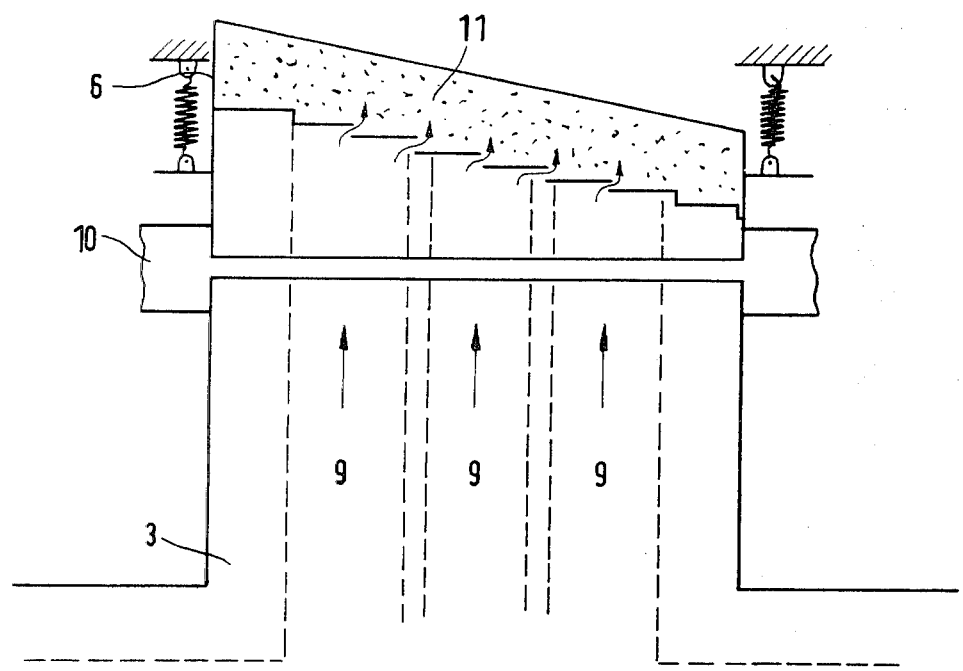

The process according to the invention will be described hereinafter in greater detail with reference to two figures, in which:

FIG. 1 is a diagrammatic view of an apparatus for pre-heating iron sponge, in accordance with the invention, and FIG. 2 is a diagrammatic view of a section of FIG. 1.

According to the invention, for the purposes of pre-heating, carbon-bearing iron sponge is moved in the form of a loose fill, and a hot gas is passed through the fill transversely with respect to the direction of movement. A travelling grate, a shaker trough, a vibrating conveyor or the like can be provided for forming such a loose fill. Preferably, movement of the iron sponge is effected by means of a vibrating conveyor. The structure and the mode of operation of a vibrating conveyor are sufficiently known to the man skilled in the art.

In accordance with a preferred embodiment of the invention, the direct contact between the iron sponge and the hot gas is effected under such conditions that the carbon present in the iron sponge is ignited and oxidised by the hot gas. Oxidation of the carbon is effected in accordance with known reactions, as:

(1) $C + \frac{1}{2}O_2 \rightarrow CO$ (2) $C + CO_2 \rightarrow 2CO$ (3) $C + H_2O \rightarrow H_2 + CO$ In this way, the iron of the iron sponge is protected from oxidation to form iron oxide (FeO).

So as to achieve a very good protective action, the iron sponge must have a certain minimum content of carbon. The lower limit value in respect of the carbon content depends on the composition of the hot gas and to a lesser extent on other process parameters, and is about 0.5%; more advantageously, the iron sponge should have at least 1.5% carbon; preferably, the carbon content is between about 1.7% and 4%.

So that ignition of the carbon and combustion thereof to form substantially carbon monoxide (CO) occurs throughout the fill as quickly as possible before any oxidation of the iron sponge worth mentioning occurs, the hot gas should be at a high temperature and should impinge on the fill at a very high speed. On direct contact with the iron sponge, the temperature of the hot gas is preferably at least 1200° C.; particularly preferred temperatures are from 1250° to 1650° C.; particularly good results are achieved with temperatures between 1450° and 1550° C. In order to provide that the hot gas flows through the fill at very high speed, the flow speed of the hot gas should be at least 1 m/s. A particularly preferred flow speed is from 1.5 to 2.5 m/s. In order to provide for the high-speed impingement of the hot gas on the fill over the entire height thereof, the height of the fill layer should not exceed 25 cm; the height of the layer is preferably in the range from 7 to 15 cm.

In addition, the residence time of the iron sponge in the region of action of the hot gas should be short. This causes a low residual carbon content in the iron sponge, and the danger of oxidation of the iron is even further reduced. Preferably, the residence time should not exceed 100 s; a particularly preferred residence time is from 65 to 90 s.

The above-indicated data relating to temperature, flow speed and residence time relate to a hot gas of conventional composition as can be produced by combustion of a carbon-bearing fuel with air or with oxygen-enriched air in a burner; carbon-bearing fuels given by way of example are natural gas, crude oil or petroleum, heavy oil, heating oil and the like. Such a hot gas essentially comprises carbon dioxide and water vapour, together with nitrogen and small amounts of oxygen and carbon monoxide; usually, the proportion of uncombined oxygen ($O_2$) is from 1 to 3%. A saving of fuel can be achieved if the hot waste gas taken from the electric furnace is also used, partly or completely, for preparing the hot gas; more advantageously, this hot waste gas is mixed with the burner waste gases. Taken overall, the throughput of hot gas should be at least 500 $Nm^3/t$ of iron sponge.

The iron sponge can be used in the form in which it occurs after the direct reduction operation. The required carbon content is ensured by using a suitable composition of reduction gas and/or by introducing natural gas into the cooling zone of the direct reduction furnace. On the other hand, the iron sponge can also be used in a passivated form and/or in briquette form. It is also possible for a mixture of iron sponge and fine grist, for example shredder grist to be fed to the pre-heating operation. If a mixture of this kind does not have the required carbon content, additional carbon can be added to the mixture, for example in the form of fine coal.

It is also possible, preferably when using iron sponge with an excessively low carbon content, for the iron sponge to be saturated with oil before being disposed on the shaker trough. The hydrocarbons contained in the oil take over the protective function of the carbon to avoid re-oxidation of the iron sponge. In addition, a further additional input of energy in the pre-heating operation may be achieved in this way. The saturating agents used are preferably heavy oils which are produced in the utilisation of crude oil or petroleum.

An apparatus by way of example for carrying out the process according to the invention is shown in diagrammatic form in FIGS. 1 and 2. The apparatus shown in FIG. 1 includes an iron sponge bunker 1, a magnetic metering trough 2, a combustion chamber 3 with the natural gas burner 4, a stack 5, a vibrating conveyor 6, the electric furnace 7 and a chute 8. In this test apparatus, the vibrating conveyor 6 used is a shaker trough through which gas flows in an upward direction and on which the loose material is fed in the direction of conveyance, with a layer height which is constant in time, over an area of 0.3 m in width and 1 m in length. The conveyor capacity may be varied between two and seven t/h. In a combustion chamber 3 which is arranged below the shaker channel 6, about 1000 to 2500 $Nm^3/h$ of hot gas, at temperatures of up to 1550° C., is produced by the combustion of natural gas with air in the burner 4. The arrangement of the combustion chamber 3 with the vibrating conveyor 6 is shown in detail in FIG. 2; it will be seen that the hot gas 9 flows out of the combustion chamber 3 through the openings in the gas seal 10 in an upward direction into the vibrating conveyor 6 and passes upwardly through the iron sponge 11 which is moved in the form of a loose fill. Above the fill, the discharged waste gas is passed through a stack 5 to the chamber-type dust-collection means (see FIG. 1). The iron sponge is metered out of the bunker 1 by a magnetic trough 2 as the take-off means. The hot iron sponge is discharged into the electric furnace 7 by way of a pivotal chute 8.

A series of tests with this apparatus shows that carbon-bearing iron sponge can be pre-heated, in direct contact with burner waste gases, without substantial oxidation of the iron, to temperatures of about 800° to 1000° C., if the carbon content is at least 1.5%; if any loss of metallisation at all occurs, this is not more than 0.5%; the loss of carbon due to burning is about 1.2%.

EXAMPLE

Iron sponge, in a layer which is 100 mm in height, is pre-heated on a vibrating conveyor as shown in FIG. 2. The iron sponge has a residence time of 80s on the vibrating conveyor. The fill is subjected to a flow of waste gases from a natural gas burner at 1520° C. At conditions of 25° C. and 1 atmosphere, the waste gases have a flow speed of 1.7 m/s. The iron sponge leaves the vibrating conveyor at a mean temperature of 870° C.; when put on to the vibrating conveyor, the iron sponge had a carbon content of 2.5%, a total iron content of 92% and a content of metal iron of 86.5%; the so-called degree of metallisation ($Fe_{met} \times 100\ Fe_{ges}$) was 94%. When leaving the vibrating conveyor, the sponge iron still contained 1.3% of carbon. The degree of metallisation had virtually not changed.

For comparison purposes, the above-indicated Example is substantially repeated; except that iron sponge with a carbon content of 1.4% is fed to the vibrating conveyor, and the pre-heated iron sponge leaves the vibrating conveyor at a mean temperature of 1000° C.; a mean metallisation loss of about 1.2% was found, and the loss of carbon due to burning off is about 1.2%.

We claim:

1. A method of preheating carbon containing iron sponge, said method characterized by the non-combustion of said iron sponge, the method comprising steps of:
   providing carbon bearing iron sponge which contains at least 0.5% carbon;
   moving the iron sponge into a melting crucible;
   providing a stream of oxidizing hot gas, the hot gas having a temperature of at least 1200° C. and having a flow rate of at least 1 m/s as measured at 20° C. and 760 Torr;
   flowing the hot gas through the iron sponge in a direction transverse to the direction of movement of the iron sponge and in direct contact with essentially all of the iron sponge;
   effecting said direct contact between the hot gas and the iron sponge under conditions such that carbon present in the iron sponge is ignited and oxidized by the hot gas.

2. A process according to claim 1 characterised in that a vibrating conveyor is used for moving the fill.

3. A process according to claim 1 or 2 characterised in that the iron sponge contains at least 1.5% of carbon.

4. A process according to claim 1 or 2 characterised in that the hot gas upon direct contact with the iron sponge has at least a temperature of 1200° C.

5. A process according to claim 1 or 2 characterised in that a high-speed flow of hot gas impinges on the iron sponge, the flow speed of the hot gas being at least 1 m/s under normal conditions (20° C., 760 Torr).

6. A process according to claim 1 or 2 characterised in that the height of the layer of the iron sponge which is moved in the form of a loose fill is kept below 25 cm.

7. A process according to claim 1 or 2 characterised in that the residence time of the iron sponge in the region of action of the hot gas is kept at less than 100 s.

8. A process according to claim 1 or 2 characterised in that the hot gas is produced by the combustion of carbon-bearing fuels and the hot gas throughput is at least 500 $Nm^3/t$.

9. A process according to claim 1 or 2 characterised in that the hot waste gases of the electric arc furnace are also used for producing hot gas.

10. A process according to claim 2 characterized in that, before being fed on to the vibrating conveyor, the iron sponge is saturated with oil.

* * * * *